(12) United States Patent
Gerstel et al.

(10) Patent No.: US 8,045,853 B2
(45) Date of Patent: Oct. 25, 2011

(54) MECHANISM FOR TRACKING WAVELENGTHS IN A DWDM NETWORK WITHOUT SPECIALIZED HARDWARE

(75) Inventors: Ornan Gerstel, Los Altos, CA (US); Stefano Piciaccia, Milan (IT); Mauro Rudy Casanova, Milan (IT); Valerio Viscardi, Milan (IT); Gabriele Galimberti, Lombardia (IT)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 11/566,400

(22) Filed: Dec. 4, 2006

(65) Prior Publication Data

US 2008/0131126 A1 Jun. 5, 2008

(51) Int. Cl.
*H04B 10/08* (2006.01)
*H04B 17/00* (2006.01)

(52) U.S. Cl. ............................. 398/32; 398/37; 398/181

(58) Field of Classification Search .................... 398/32, 398/37, 181
See application file for complete search history.

(56) References Cited

U.S. PATENT DOCUMENTS

| 6,392,769 | B1 * | 5/2002 | Ford et al. .................. 398/9 |
| 6,449,070 | B1 | 9/2002 | Izumi |
| 6,574,016 | B1 * | 6/2003 | Harley et al. .................. 398/79 |
| 2008/0240713 | A1 * | 10/2008 | Lu et al. .................. 398/17 |

* cited by examiner

*Primary Examiner* — Nathan Curs

(57) ABSTRACT

In one embodiment, techniques provide a mechanism for tracking wavelengths in a DWDM network. In particular, embodiments of the present invention also provide for connection tracking using a slowly modulated pilot tone in a DWDM network without dedicated hardware for the generation and the diction of the tone.

19 Claims, 3 Drawing Sheets

MECHANISM FOR TRACKING WAVELENGTHS IN A DWDM NETWORK WITHOUT SPECIALIZED HARDWARE

BACKGROUND OF THE INVENTION

The present invention relates to optical systems and, more particularly, to systems and methods for tracking wavelength communication channels through WDM (Wavelength Division Multiplexing) systems.

In WDM systems, multiple optical signals having different wavelengths share an optical fiber, each wavelength defining a particular communication channel. WDM systems have many advantages in implementing optical communications including increased capacity and the ability to use passive optical components to redirect all, or a portion, of the data flowing along a fiber. In a stricter sense, WDM refers to an ITU (International Telecommunications Union) standard that includes the specification of the particular channel wavelengths and the spacing between these channels. DWDM (Dense WDM) refers to a more recent ITU standard in which the channel spacing is tighter with more wavelength channels packed into an optical fiber. The term WDM as used herein refers to the first, more inclusive sense such that is includes both the ITU WDM and DWDM standards, unless specifically stated otherwise.

When transmitting optical signal from a source to a destination, the endpoints of the connections are established and known. However, in large networks, such as a global telecommunication network, there are many possible paths or routes exist that will deliver the data from the source to the destination. In any telecommunication network, it is critical to managing the network to track the route through the network for each connection.

Tracking occurs in the physical domain without reliance upon data maintained by the network system management or by node software. Because of the critical role that route tracking plays in maintaining the reliability of the telecommunication network, tracking must be immune to configuration errors, software failures, as well as hardware (switch) failures.

Typically, information in a frame header contains an identification sequence unique for each node in a communication route that each node along the route appends to the frame header. To identify the route, it is only necessary to extract the identification sequence. However, in WDM networks, the inability of the WDM hardware to look into the frame encoded in the wavelengths exacerbates the problem of route tracking because the header information is unavailable. Thus, while route tracking identification inside SONET/SDH or G.709 frames may suffice to detect a source-to-destination misconnection, it is not sufficient to find the route through the interior of the network.

One traditional way to implement route tracking in WDM networks is to use a fast pilot tone mechanism, the mechanism and operation of which are well known in the art. However, such a mechanism requires dedicated hardware for the generation and the diction of the tone. With a relatively fast modulation of the carrier signal, i.e., at a frequency low enough to avoid disturbing the signal data rate (currently 1 Gbps and higher) but high enough to pass through the automatic power control loops in the amplifier and other network equipment, a route can be tracked through a WDM network. Unfortunately, pilot tones require specialized and expensive hardware for generating, as well as detecting, through the network. It is also very difficult to add such hardware to existing WDM networks deployed without such specialized hardware. Another disadvantage that arises with the use of pilot tones is the degradation of the optical signal and the introduction of jitter.

What is needed is a mechanism for tracking wavelengths in a DWDM network without specialized hardware. An inexpensive and flexible mechanism that has maximum optical performance with functional flexibility is preferred.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
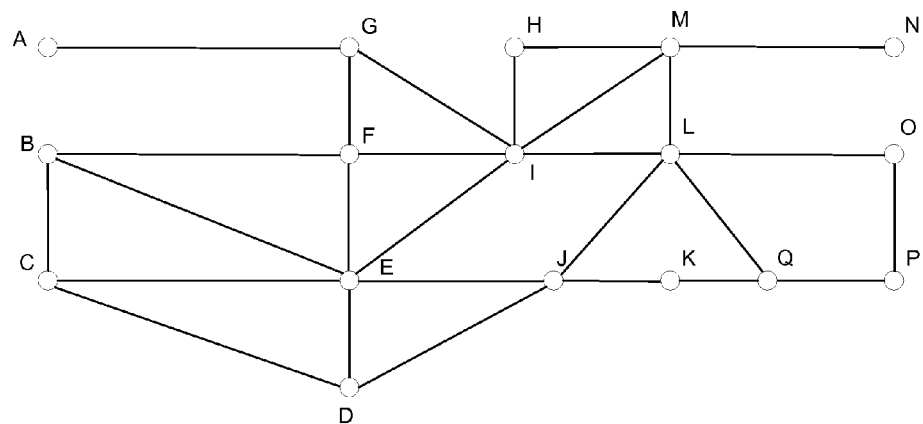
FIG. 1 illustrates an exemplary and simplified WDM optical network in accordance with an embodiment of the present invention.

The present invention relates to route tracking in a WDM optical network and, more particularly, to a mechanism for tracking a route through an optical network architecture.

The present invention provides a mechanism for tracking wavelengths in a DWDM network. In particular, the present invention also provides a method of connection tracking without using a fast pilot tone in a DWDM network and without dedicated hardware for the generation and the diction of the tone.

In one embodiment, the present invention comprises a software-based tracking mechanism that provides a slow modulation of the signal at a source node. Intermediate nodes use existing photodiodes to determine wavelength routing, allowing the wavelength to be tracked without any dedicated hardware. The solution builds upon the fact that a Reconfigurable Optical Add/Drop Multiplexer (ROADM) and other optical switches have visibility into each wavelength via dedicated photodiodes that enables a tracking solution that is hitless on the live traffic.

In the following description of embodiments of the present invention, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Further, in the following description of embodiments of the present invention, numerous specific details are presented to provide a complete understanding of the embodiments of the invention. One skilled in the relevant art will recognize, however, that the invention may be practiced without one or more of the specific details, or with other methods, components, etc. In other instances, well-known structures or operations are not shown or described in detail to avoid obscuring aspects of various embodiments of the invention. Wherever possible, the same reference numbers will be used throughout in the drawings to refer to the same or like components.

Refer now to FIG. 1, which illustrates an exemplary and simplified WDM optical network that includes nodes A-P. In this network, the nodes A-P are organized as a mesh network, though the present invention is easily adaptable to a loop network. Users connected to the nodes send user data in the form of optical signals to other users at other nodes through the network. One of the nodes, such as node D, may function as a network management server that controls network operations. For example, the network management server may be a Cisco Transport Manager (CTM), which is the industry's most advanced optical transport domain manager and which is commercially available from Cisco Systems, the assignee of the present invention. The CTM preferably includes an Element Management System (EMS) that helps the telecom to manage diverse technologies such as DWDM, SONET and SDH network elements.

For optical networks stretching hundreds, and even thousands of kilometers, optical amplifiers (not illustrated) correct for any signal attenuation and are located at each node to boost signal strength. In normal operation, automatic gain control (AGC) ensures that the optical amplifiers properly amplify the optical signals. These amplified signals are then sent through the network and guided through the nodes from the source node to the destination node.

There exists an infrequent but still troublesome problem of errant transmission of optical signals so that optical signals from a source node do not arrive at the destination. This is one reason for tracking the wavelength path from the source node to the destination node because it is critical to quickly identify the node where the wavelength was misdirected, once it occurs, so that the problem can be corrected.

Figure 2:
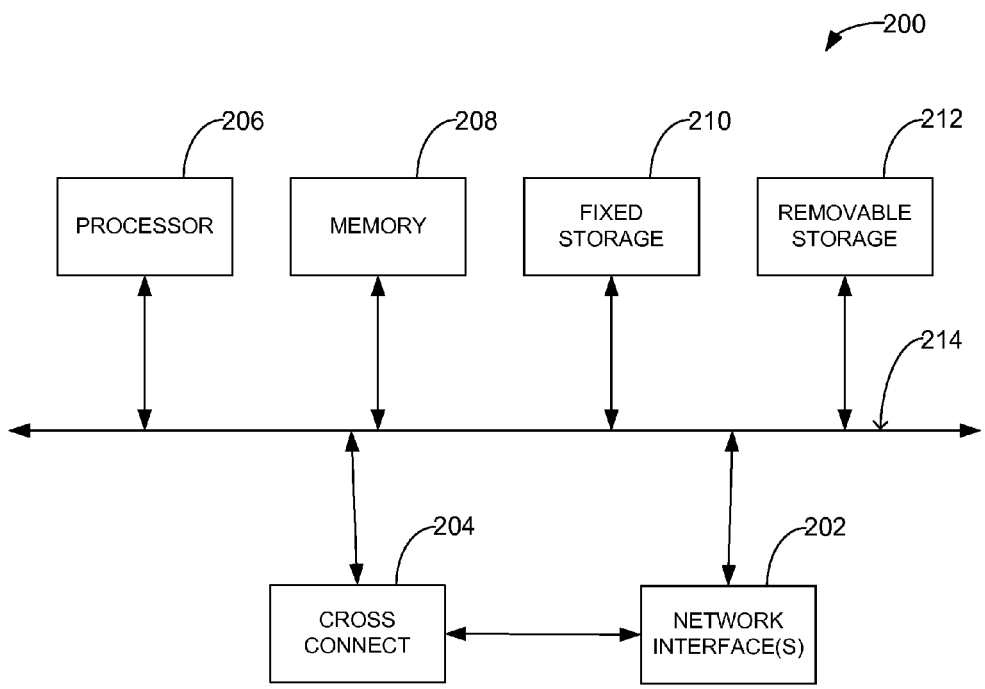
FIG. 2 illustrates a representative network device for implementing a node in mesh network in accordance with an embodiment of the present invention.

FIG. 2 depicts a representative network device 200 for implementing nodes of mesh network 100. Network interfaces 202 are provided for each link to which the node connects. Each network interface 202 incorporates the necessary optical interface components including an appropriate laser and photodiode, circuitry for recovering digital data streams and for modulating digital data onto a transmitted signal, and appropriate circuitry for mapping optical data streams into, for example, an OC-48 signal, and for demapping optical data streams from, for example, an OC-48 signal.

Individual data signals received and transmitted by the network interfaces 202 are interconnected by cross-connect 204. Cross-connect 204 can connect a received data signal to any desired transmitted optical signal. Cross-connect 204 may, but preferably does not, require optical to electrical to optical conversion to complete the interconnection. In one embodiment, cross-connect 204 comprises a MEMs cross-connect that accepts an optical input signal, adds and drops selected wavelengths before transmitting an optical signal at the output. In this embodiment, the cross-connect does not require the optical signal to be converted from the optical domain to the electrical domain and then back to the optical domain. The cross-connection state of cross-connect 204 is configured by a processor 206. In some embodiments, processor 206 may be a digital signal processor, often referred to in the art as a DSP. Functionality of processor 206 may be divided among multiple processors or may be implemented all or in part by integrated circuits such as FPGAs, ASICs, or the like. Note that optical cross-connect 204 may, in some embodiments, work entirely at the optical layer without having to convert wavelengths to electrical and back again Processor 206 also receives and generates overhead information that may be included with the individual data signals as well as the overall OC-48 signals. Processor 206 controls signaling and switching operations to implement embodiments of the present invention. Processor 206 executes software that would be stored in a computer-readable storage medium such as a memory 208. Other examples of a storage medium that may hold instructions for execution by processor 206 include, e.g., fixed storage 210 or removable storage 212, either of which may include one or more CD-ROMS, DVD-ROMS, floppy disks, or a signal received over the Internet, etc. One or more bus structures, illustrated by bus 214 electrically connect components 202-212.

Processor 206 implements a software-based tracking mechanism that provides a slow modulation of the signal at the source node. Intermediate nodes use their existing photodiodes to determine where the wavelength is routed, allowing the system to track it without any new hardware because optical switches such as ROADMs and other such optical switches have visibility into each wavelength via dedicated photodiodes.

The present invention is implemented in the physical domain, without relying on the data maintained in management systems or node software and is immune to mis-configurations, software failures as well as hardware (switch) failures. The present invention is particularly well suited for DWDM networks where a path trace ID inside the SONET or G.709 frame may be sufficient to detect an end-to-end mis-connection but not a localized the problem inside the network because current DWDM technology does not provide the ability of the DWDM gear to look into the digital data encoded in the wavelengths. Accordingly, rather than requiring manual configuration of each inter-office service connection, each ingress and egress end-points of the service, and at each of a dozen or more intermediate add/drop nodes, the present invention provides a software-based tracking mechanism that provides a slow modulation of a tracking signal at a source node. Intermediate nodes use existing photodiodes to acquire the signal and pass the detected information to the EMS or, alternatively, the CP. The EMS then determines wavelength routing thereby allowing the wavelength to be tracked without any dedicated hardware.

Figure 3A:
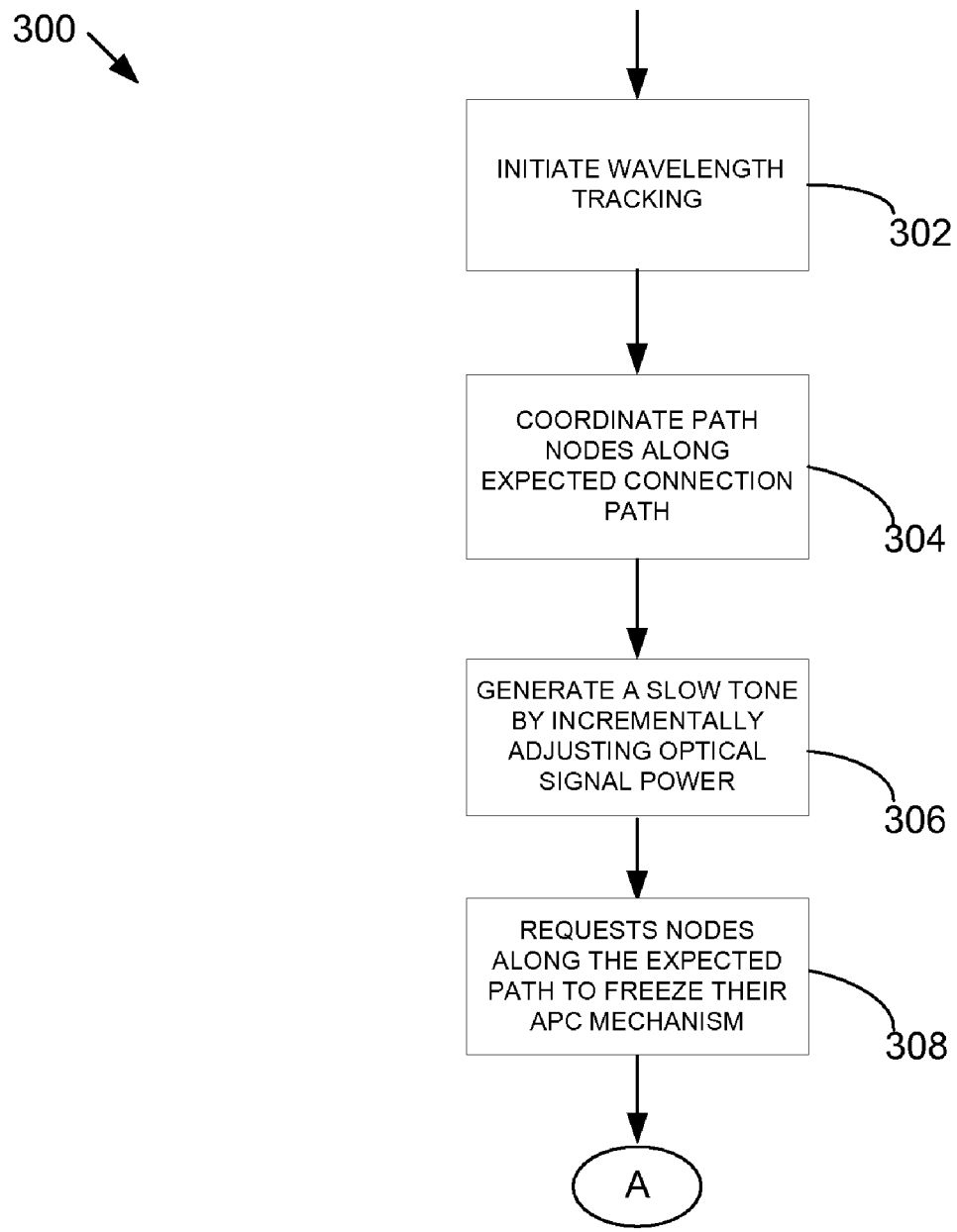
FIGS. 3A and 3B illustrate a method for initiating a process for tracking an optical signal throughout a network in accordance with an embodiment of the present invention.
Figure 3B:
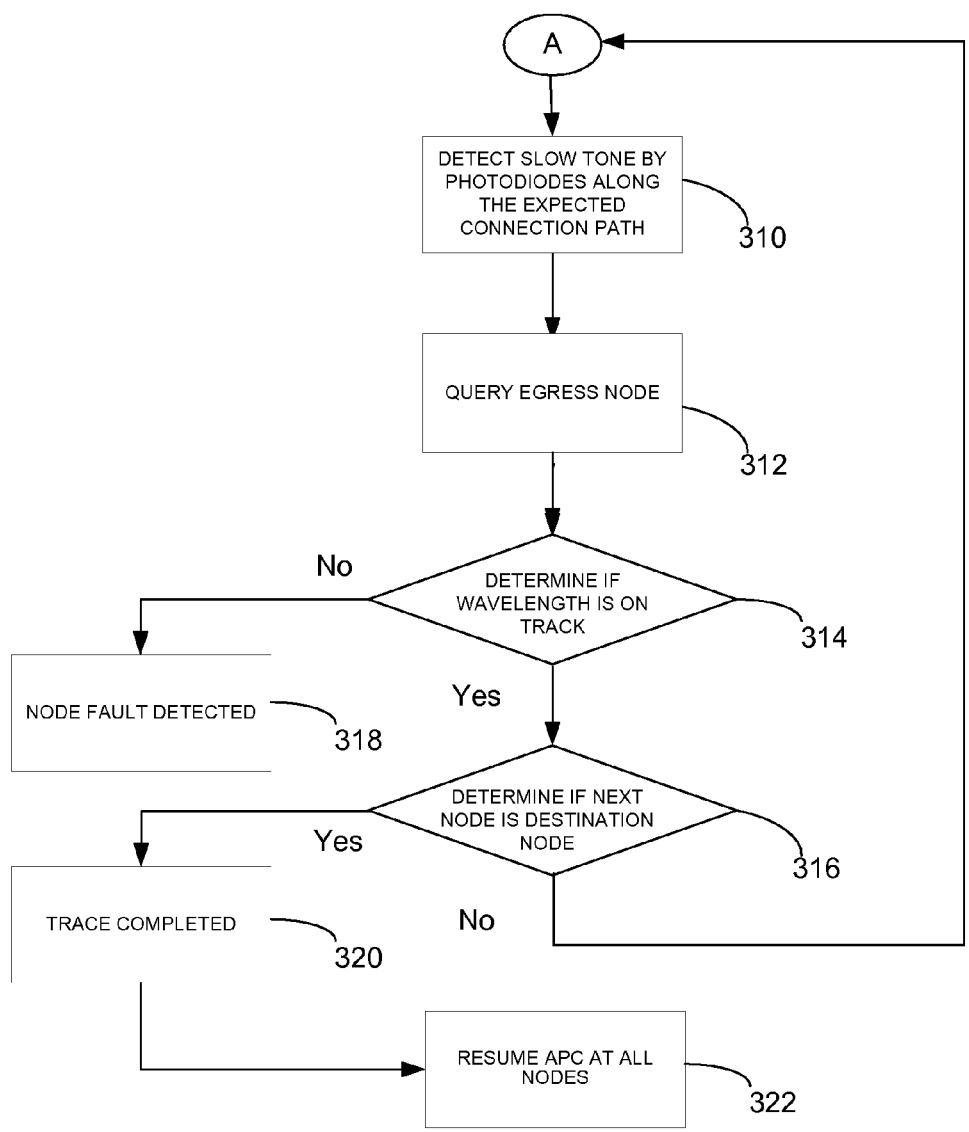

FIGS. 3A and 3B illustrate a method for tracking an optical signal through a network in accordance with an embodiment of the present invention. Specifically, as indicated at 302, a trigger arrives (user generated or automatic) to initiates the tracking of a wave throughout the network.

At 304, either the Element Management System (EMS) on the CTM or the control plane (CP) coordinates the nodes along the expected path of the connection. The EMS provides network element management functions for optical transport networks by reducing the complexity of operations through remote and centralized network elements. The EMS may includes operational functions, such as, by way of example, configuration management, fault management, performance management, and security management functions.

At 306, the source node receives a request to generate a slow "tone" by an ingress device such as a variable optical attenuator (VOA) or other device that can incrementally adjust the power of the optical signal passing through it. At 308, the EMS or, alternatively, the CP then requests that nodes along the path freeze their auto power control (APC) mechanism to allow the tone to go through. At 310, the slow tone is detectable by photodiodes embedded in one or more mux/demux devices along the path, such as a static multiplexer, ROADM or wavelength router. Preferably, the tone takes into account the 100 ms polling time through the switch on the card.

At 312, EMS/CP queries the egress mux at each site to identify the connection for the channel. After parsing the information, the EMS determines if the signal is going in the right direction as indicated at 314 and whether the next node is the destination node as indicated at 316. If the signal has not arrived at the destination, but it is going in the right direction, the process repeats at the next node as indicated at 310-312. If, however, the wavelength is going in the wrong direction— the failure is thereby identified as indicated at 318 and the appropriate alarms may be generated to notify network administrators.

Once the tracking process is complete, as indicated at 320, APC is resumed at all the nodes as indicated at 322 until the next trace is initiated.

Note that the temporarily freezing of the APC is critical to the successful determination of the wavelength routing. It is further noted that it useful to associate a unique identifier with each optical connection into the network to trace misconnections.

It is possible to expand the capability of this methodology by introducing the concept of a channel key. Specifically, a unique identifier is dedicated to each optical connection in the network to trace misconnections.

In one embodiment of the present invention, a unique frequency is associated with each connection so that each connection can then be discriminated based upon the wavelength. Note that it is necessary to associate different frequencies to connections carried on the same wavelength, however, frequencies may be reused on a different wavelength. The wavelength/frequency couple acts as a channel identifier. Since the frequency is an analog signal, it functions as an analog key. It will be recognized, however, that the analog key is complicated to implement and does not easily scale.

In another embodiment of the present invention, a digital channel key is provided. In accordance with this embodiment, a digital key comprises a stream of bits for each channel. When the pilot tone is activated, which implies that the end-to-end circuit tracing is not correct and/or a misconnection has been identified, the digital channel key is wrapped in a message that simplifies the detection of the key. Preferably, the message can be either synchronously or asynchronously periodically transmitted over the wavelength.

The message comprises a preamble that locks the receiver and the digital channel key functions as a unique channel identifier. Preferably, the ingress node shall wait before sending the key again.

The digital channel key length is typically an engineering decision that depends upon network size or the application. In general, a selected number of bits, such as four, eight, sixteen etc., may compose the key. To illustrate, with an 8 bit key, it is possible to identify up to 256 unique channels while with a 16 bit key more than 65,000 channels can be uniquely identified. Accordingly, one significant advantage with the digital channel key arises from the ease in scalability.

The preamble locks the receiver (far end) side and does not require precise control of the frequency. It contrast to the analogy key embodiment, the digital channel key requires only one frequency to carry the information rather than an increase or a decrease in the frequency to carry the information.

The message returns network utility data that pertains to the operation of the network itself rather than to the services provided to the network users by the network.

In accordance with an embodiment of the present invention, a software based wavelength tracking mechanism is provided that does not require dedicated pilot tone hardware and works with existing amplifiers and MUX/DMX/ROADM/WR devices. Rather a tone is based on a slow modulation of the carrier signal, and its detection requires freezing the power control adjustments. Advantageously, while prior art requires additional hardware to the network and is therefore difficult to implement, the present invention does not requires any such additional hardware and can be implemented as a software upgrade. The present invention is particularly suited for use in optical networks that do not include an integrated high speed pilot tone in the network.

Although the invention has been discussed with respect to specific embodiments thereof, these embodiments are merely illustrative, and not restrictive, of the present invention. Although specific protocols have been used to describe embodiments, other embodiments can use other transmission protocols or standards. Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, operations that are illustrated in a sequential manner in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components ors will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A wavelength division multiplexed (WDM) network having a plurality of interconnected nodes sending data to each other along wavelength paths, at least a portion of said nodes having one or more optical amplifiers operating under automatic power and gain control in normal operation, the WDM network comprising at least one node along an intended route between a sending node and a receiving node in a path of the WDM network, wherein the at least one node is configured to suspend its automatic power control functions in order to allow a slow tone on a carrier signal in the path of the WDM network to pass through it, wherein the slow tone is configured to indicate routing information for the wavelength.

2. The WDM network of claim 1, wherein the at least one node is configured to recover from the slow tone a unique frequency associated with each optical connection for which routing of the wavelength is to be tracked.

3. The WDM network of claim 2, wherein the at least one node is responsive to detecting the channel key to return network utility data to a network management node, wherein the network utility data comprises data that pertains to operation of the WDM network.

4. The WDM network of claim 1, wherein a plurality of nodes in the at least a portion of said nodes are configured to suspend automatic power control functions in order to allow the slow tone to pass along the path of the WDM network.

5. A node configured for operation in a wavelength division multiplexed (WDM) network, the node comprising:
a network interface device configured to interface optical signals to and from the WDM network; and
a processor configured to:
receive a trigger configured to initiate tracking of a wavelength through the WDM network along a path associated with an optical connection;
generate a digital channel key, wherein the digital channel key comprises a stream of bits that serves as a unique channel identifier for the optical connection;
control the network interface device to generate a slow tone on a carrier optical signal, the slow tone indicating routing information for a wavelength, combine the carrier signal with at least one of a plurality of optical signals transmitted to the WDM network, and include the digital channel key in the slow tone; and
send a request to nodes along the path to freeze their respective automatic power control mechanism for a duration of wavelength tracking or until a failure is identified at which time automatic power control is resumed for all nodes along the path.

6. The WDM network of claim 5, wherein the processor is configured to generate a message that contains a preamble and the digital channel key, wherein the preamble is configured to enable a receiving node to lock to it without precise frequency control.

7. In a wavelength division multiplexed (WDM) network having a plurality of interconnected nodes sending data to each other along wavelength paths, at least one intermediate node having one or more optical amplifiers operating under automatic power and gain control in normal operation, a method comprising:
suspending automatic power control at the at least one intermediate node in a path of the WDM network to allow a slow tone on a carrier optical signal sent by a sending node to pass along the path, the slow tone indicating routing information for a selected wavelength; and
at the at least one intermediate node, detecting the slow tone on the carrier optical signal;
querying the at least one intermediate node to obtain connection information for the selected wavelength from the at least on intermediate node; and
analyzing the connection information to determine if the selected wavelength is traveling correctly along the path.

8. The method of claim 7, and further comprising determining, based on said analyzing, whether a next node, with respect to said at least one intermediate node, is a destination node for the selected wavelength.

9. The method of claim 8, and further comprising, when it is determined that the selected wavelength has not arrived at said destination node, determining whether it is traveling in the correct direction.

10. The method of claim 9, and further comprising, generating a fault detection indication when it is determined that said selected wavelength is traveling in the wrong direction.

11. The method of claim 7, further comprising the at least one intermediate node sending the connection information to a management device, and wherein said analyzing is performed by the management device.

12. In a wavelength division multiplexed (WDM) network having a plurality of interconnected nodes sending data to each other along wavelength paths, at least one intermediate node having one or more optical amplifiers operating under automatic power and gain control in normal operation, a method comprising:
requesting suspension of automatic power control at the at least one intermediate node in order to allow a slow tone on a carrier signal in the path of the WDM network to pass through the at least one intermediate node;

generating a slow tone to include routing information for a selected wavelength without using dedicated pilot tone hardware; and modulating the slow tone on an optical carrier signal to enable tracking of a selected wavelength between a sending node and a receiving node.

13. The method of claim 12, wherein generating the slow tone comprises, at an ingress device, incrementally adjusting a power of the optical carrier signal with a variable optical attenuator.

14. The method of claim 12, further comprising querying an egress device associated with a node in the path of the optical carrier signal to obtain connection information for the selected wavelength.

15. The method of claim 14, further comprising analyzing the connection information and determining if the selected wavelength is routed along a correct path.

16. The method of claim 14, further comprising:
determining if the selected wavelength is routed along an incorrect path; and
identifying a localized failure when it is determined that the selected wavelength is routed along an incorrect path.

17. The method of claim 12, further comprising resuming normal operation of automatic power control at the at least one intermediate node when the selected wavelength reaches the receiving node.

18. A non-transitory computer-readable storage medium storing instructions, that when executed by a processor, cause the processor to:
control an optical amplifier in a node along a wavelength path in a Wavelength Division Multiplexed (WDM) network from a first node to a second node to disengage an automatic power control mechanism in order to allow a modulated optical signal for said wavelength path to go through and be detected;
control a network interface device in order to detect said modulated optical signal for said wavelength path, said modulated optical signal having been modulated onto a carrier tone and including routing information for said wavelength path; and
control said optical amplifier in said node to resume normal operations for amplifying user data under automatic power control after said wavelength path is tracked through said WDM network to a destination node or until a failure is identified.

19. The computer-readable memory medium of claim 18, and further comprising instructions that cause the processor to, in response to receiving a query, send connection information derived from said routing information contained in said modulated optical signal for said wavelength path.

* * * * *